United States Patent [19]

Reinhardt

[11] 4,368,696

[45] Jan. 18, 1983

[54] ELECTROLYTIC SUPPLEMENTAL FUEL GENERATION FOR MOTOR VEHICLES

[76] Inventor: Weldon E. Reinhardt, 12119 De Moya Dr., SE., Fort Myers, Fla. 33905

[21] Appl. No.: 173,900

[22] Filed: Jul. 29, 1980

[51] Int. Cl.³ ............................................. F02B 43/10
[52] U.S. Cl. ..................................... 123/3; 123/1 A; 123/DIG. 12; 60/616
[58] Field of Search ............. 123/1 A, 2, 3, DIG. 12; 60/616, 618, 517; 204/284, DIG. 4

[56] References Cited

U.S. PATENT DOCUMENTS

| | | | |
|---|---|---|---|
| 3,939,806 | 2/1976 | Bradley | 123/3 |
| 4,070,860 | 1/1978 | Hanson | 60/517 X |
| 4,271,793 | 6/1981 | Valdespino | 123/3 |

Primary Examiner—William A. Cuchlinski, Jr.
Attorney, Agent, or Firm—Harvey B. Jacobson

[57] ABSTRACT

A combination internal combustion engine and electrolyzer for producing hydrogen and oxygen gases from water on board a motor vehicle in order to supplement the gasoline fuel for the engine further includes a heat activated engine such as a Stirling engine to provide the electrical current necessary to decompose the water, the Stirling engine being activated directly from heat derived from the exhaust of the internal combustion engine. The oxygen and hydrogen gases formed by the electrolysis of water are passed to the air intake of the carburetor of the internal combustion engine and enable the use of a much leaner gasoline to air mixture to run the engine thus increasing gas mileage and reducing air pollutants formed by the internal combustion engine.

8 Claims, 7 Drawing Figures

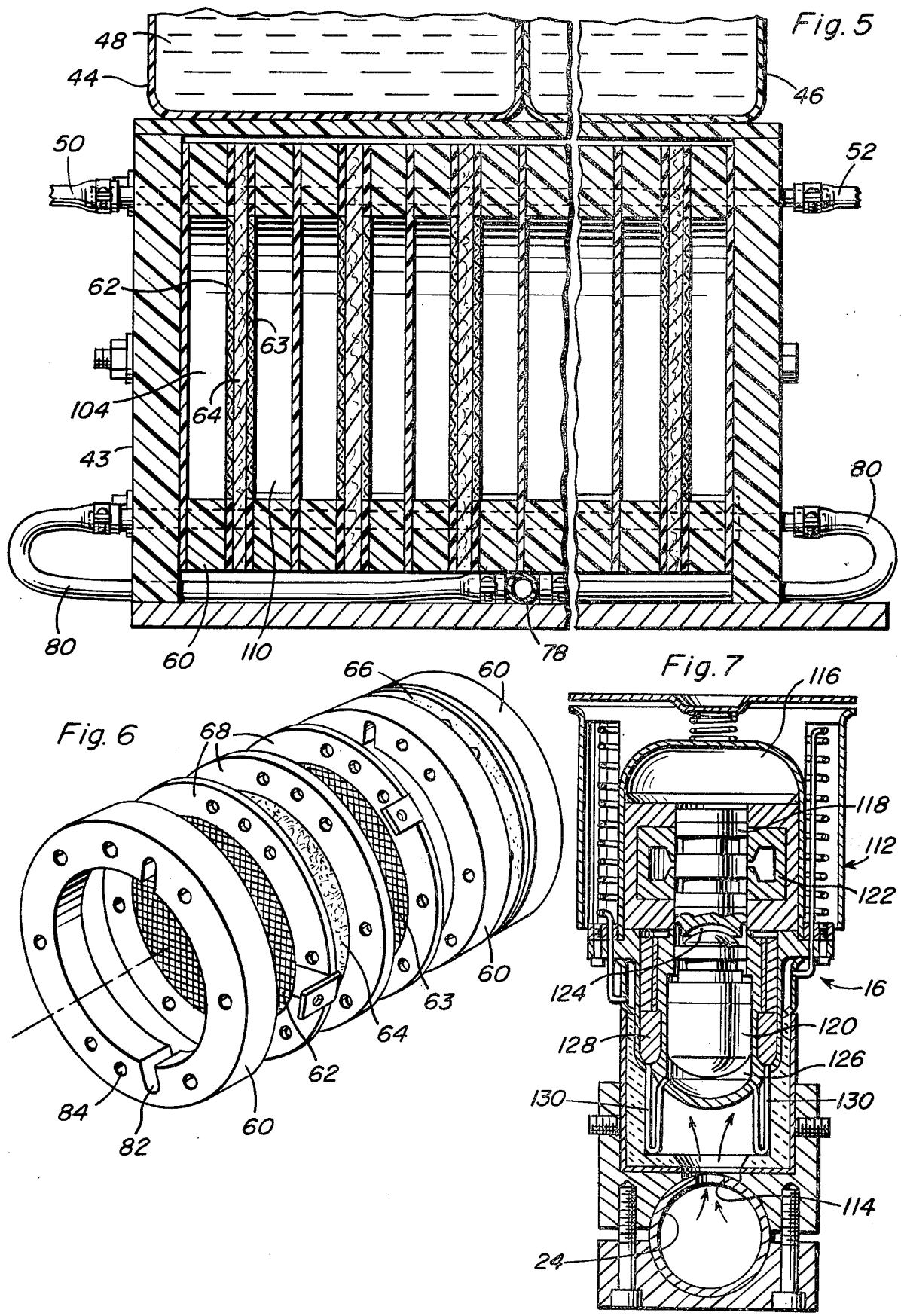

ELECTROLYTIC SUPPLEMENTAL FUEL GENERATION FOR MOTOR VEHICLES

BACKGROUND OF THE INVENTION

Field of the Invention.

At the present time, the fuel economy of an automobile is increasing in importance for consumer acceptance, and for many consumers is the primary reason for purchasing a given automobile. Of course, the rising cost of gasoline is the reason for needed increased fuel economy, though other factors such as reduced pollution due to greater fuel combustion and even national interest in conserving fuel as a broad measure to reduce oil imports and thus bolster our own economy and national security are other factors for the need of fuel economy.

The present invention provides for an internal combustion engine having increased fuel efficiency in which heat derived from the exhaust gases of the internal combustion engine is used to generate an electric current which decomposes water into separate hydrogen and oxygen gases which are used to supplement the hydrocarbon fuel used by the engine. The generation of the electric current is made possible by an engine activated by the direct exchange of heat from the exhaust gases of the internal combustion engine. The supplemental oxygen and hydrogen reduces the amount of hydrocarbon fuel needed to provide combustion thus increasing fuel economy and reducing air pollution to a large extent.

2. Disclosure Statement

Lately, considerable effort has been directed to the broad object of conserving fuel during operation of a motor vehicle. Such efforts include changes in the design of internal combustion engines, changes in the aerodynamics of the automobile body itself, substituting light metal or plastic materials for heavier automobile components, and even changing the fuel itself, such as utilizing gasohol and increased use of diesel cycle engines.

Modification to the workings of the internal combustion engine include regenerating fuel from the exhaust of the engine, with the regenerated fuel being passed back to the engine for consumption therein. A modified internal combustion engine similar to the present invention is disclosed in U.S. Pat. Nos. 3,939,806; 4,003,344; and 4,099,489, issued to Bradley and which disclose supplementing the fuel used to power an internal combustion engine by adding hydrogen and oxygen gases formed by the electrolysis of water to a system of carburetors. While the present invention is broadly directed to supplementing the fuel for driving an internal combustion engine with hydrogen and oxygen gases derived from the electrolysis of water, the aforementioned patents require cumbersome structure and operate by heating a working fluid to a gaseous state, the gas operating a turbine which runs a generator to produce the necessary electric current to decompose the water in the electrolysis cell. The associated piping and heat exchange means required by this patented system makes it impractical for on-board use in motor vehicles.

In contrast, the present invention generates the electric current used to decompose the water by utilizing an engine such as a Stirling engine which can be activated by direct heat exchange from the exhaust gases of the internal combustion engine.

SUMMARY OF THE INVENTION

The present invention produces supplemental oxygen and hydrogen gas fuel on board a motor vehicle in order to supplement the gasoline fuel used by the internal combustion engine. The supplemental fuel is produced by the electrolysis of water, separating the water molecule into its hydrogen and oxygen components by introducing an electrical current therethrough. The generation of electric current is accomplished by utilizing a heat activated engine such as the Stirling free piston linear alternator engine or any other engine which derives its energy from the waste heat of the exhaust of the internal combustion engine. The invention is characterized by the heat activated engine deriving its energy from direct heat exchange with the exhaust gases enabling the device to be installed in any existing automobile, unlike prior art devices developed to provide a hydrogen-rich fuel mixture requiring elaborate and bulky pipe systems and complex electrical generating equipment to decompose the water into its component gases.

Accordingly, it is an object of the present invention to produce hydrogen and oxygen gas on board a motor vehicle in order to supplement gasoline as a fuel for an internal combustion engine.

It is a further object of the invention to produce hydrogen and oxygen gas on board a motor vehicle in order to supplement gasoline as a fuel for an internal combustion engine by generating an electric current for decomposing water into its gaseous components, in which the electric current is generated by a heat activated linear alternator engine deriving its energy from the waste heat of the exhaust.

It is another object of the present invention to produce hydrogen and oxygen gas on board a motor vehicle in order to supplement gasoline as a fuel for an internal combustion engine by the aforesaid method, in which the heat activated linear alternator engine derives its energy by direct heat exchange with the exhaust gases from the internal combustion engine.

It is still another object of the present invention to provide a device for decomposing water into its gaseous components in order to supplement gasoline as a fuel for internal combustion engines, in which the device includes a heat activated linear alternator engine to generate an electric current, which current is utilized to decompose the water, and including means to feed the formed gaseous products to the carburetor of the internal combustion engine.

It is yet another object of the present invention to provide a device of the character aforesaid, in which the heat activated linear alternator engine is able to derive its energy by direct heat exchange with the exhaust gases of the internal combustion engine.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 5 is a longitudinal sectional view of the electrolyzer taken generally along the line 5—5 of FIG. 2.

FIG. 6 is an exploded perspective view illustrating the individual components making up one cell of the electrolyzer of the present invention.

FIG. 7 is a cross-sectional view of the preferred heat activated engine utilized in the supplemental fuel generation system of the present invention shown in heat exchange relation with the exhaust gas from an internal combustion engine.

DETAILED DESCRIPTION OF THE INVENTION

Figure 1:
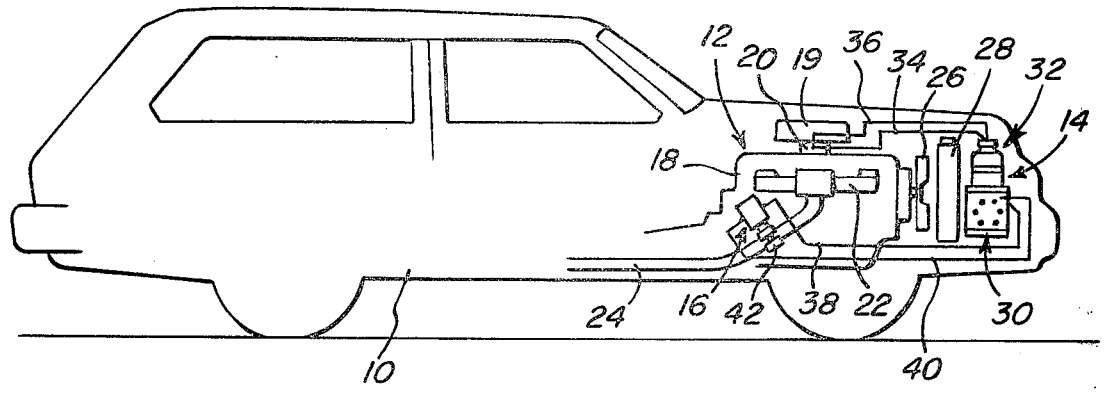
FIG. 1 is a schematic view illustrating the essential elements of the present invention on board a motor vehicle.

The supplemental fuel generating device of the present invention can be easily installed on board any existing automobile. Referring to FIG. 1, vehicle 10 is shown including internal combustion engine 12 and the supplemental fuel producing device of the present invention including electrolyzer 14 and the heat activated engine 16 for generating the electric current used to decompose the water. Internal combustion engine 12 containing engine block 18 has mounted thereon air filter 19 and carburetor 20 for receiving both hydrocarbon fuel such as gasoline and the supplemental hydrogen and oxygen gas produced by electrolyzer 14. Carried by engine block 18 is an exhaust manifold 22 from which extends exhaust pipe 24. Engine block 18 includes a cooling system in accordance with accepted practice including fan 26 and radiator 28.

Electrolyzer 14 can be described as containing two systems, one system performing the electrolyzing function indicated at 30 and the other system providing the storage for the electrolyte solution and the supply for the supplemental hydrogen and oxygen fuel, generally indicated at 32. Supply 32 contains separate hydrogen and oxygen transport hoses 34 and 36, respectively, for supply to carburetor 20.

Heat activated engine 16 is a heat activated motor driven alternator used to generate linear rather than sinusoidal alternations of electric current for the electrolyzer 14. Electric current from the heat activated engine 16 is conducted through a rectifier (not shown) to change AC to DC current and then conducted by conductors 38 and 40 to the individual electrode contacts contained on electrolyzer 14. The heat activated motor driven alternator 16 is positioned adjacent exhaust pipe 24, or more preferably, an extension (not shown) of exhaust pipe 24 by clamp 42. The preferred heat activated engine is the Stirling free piston linear alternator engine as shown in FIG. 7. The free piston Stirling engine is preferred because of its ability to be scaled to particular specifications and be operated in any position and therefore, it can accommodate the space requirements of engine components making it easily adaptable for on board motor vehicle use.

The operation of the supplement fuel generation system of the present invention may be summarized by the following explanation. Heat derived from exhaust manifold 22 and exhaust pipe 24 is used to activate engine 16 which in the case of the Stirling free piston linear alternator engine will generate electrical current by the linear movement of the piston. The current is conducted to electrolyzing system 30 which receives from storage and supply 32 the water or aqueous electrolyte solution. The water in the form of an electrolyte solution 48 in separate reservoir tanks 44, 46 is decomposed into its hydrogen and oxygen gaseous components and conveyed back to separate reservoir tanks 44, 46 to the supply 32 whereupon the hydrogen and oxygen gases are separately conveyed to carburetor 20. The supplemental hydrogen and oxygen gas fuel enables a much leaner gasoline-to-air mixture to be used, resulting in greater fuel economy and greatly reduced air pollution.

Illustrated in FIGS. 2–6 is electrolyzer 14. Electrolyzer 14 includes electrolyzing system 30 and storage and supply system 32 supported on box-like frame structure 43.

Storage and supply 32 comprises two tanks, hydrogen supply tank 44 and oxygen supply tank 46, held together by strap 45 and preferably made of plastic and which not only act as gas separators but as reservoirs for aqueous electrolyte solution 48. Tank 44 receives hydrogen gas from electrolyzing system 30 through tubing 50 and 52 while tank 46 receives oxygen gas from tubing 54 and 56. Tubing 50, 52, 54 and 56 are joined to respective tanks 44 and 46 via a connector such as fitting 51. The gases produced in electrolyzing system 30 are mixed with the electrolyte in the form of foam which is pushed into the respective storage tanks where the gases separate from the electrolyte and are conveyed to the intake manifold of the internal combustion engine by respective tubing 34 and 36 fitted to tanks 44 and 46, respectively, by fittings 35 and 37. The electrolyte is returned to electrolyzing system 30 by electrolyte return tubing such as indicated at 58 shown in FIG. 4.

Figure 2:
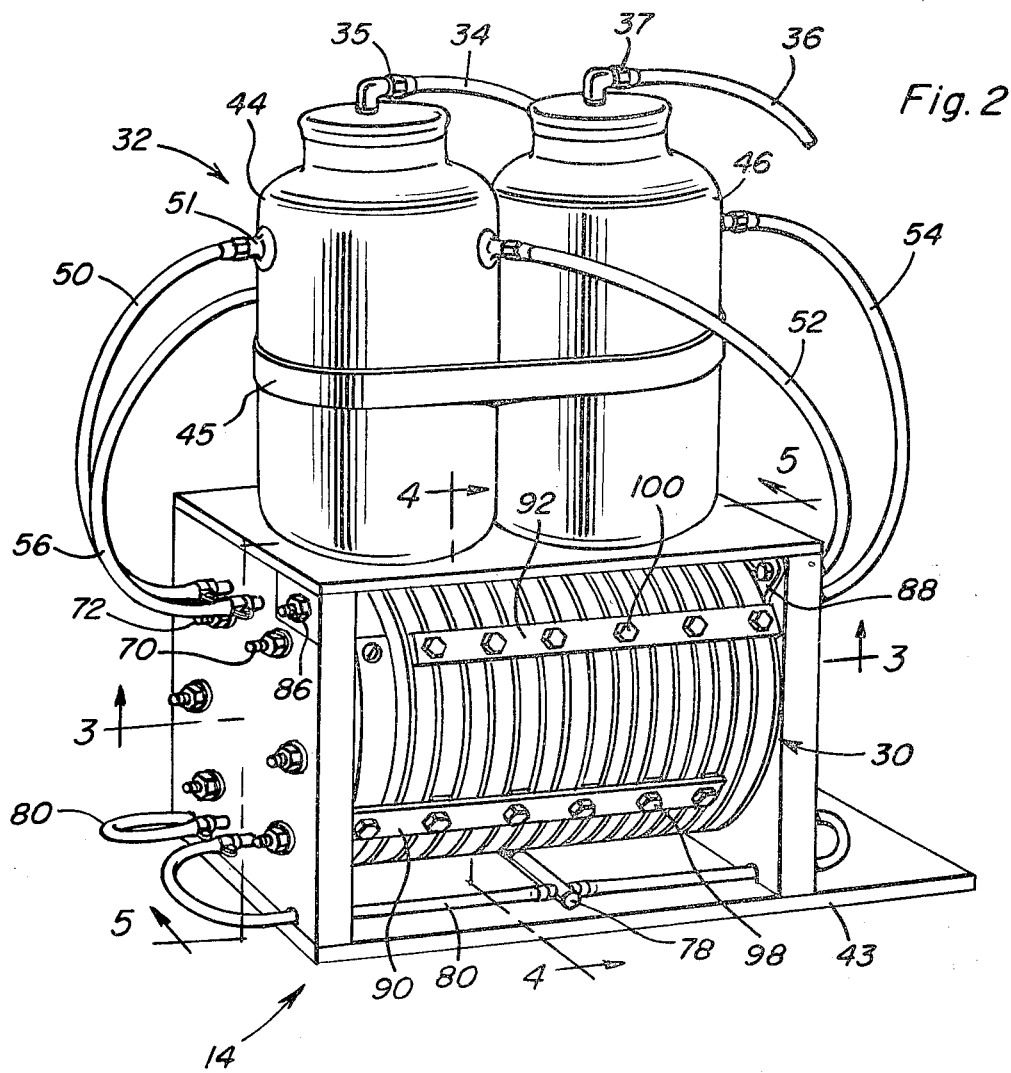
FIG. 2 is a perspective view of the electrolyzer of the present invention used to decompose water into its separate gaseous components.
Figure 3:
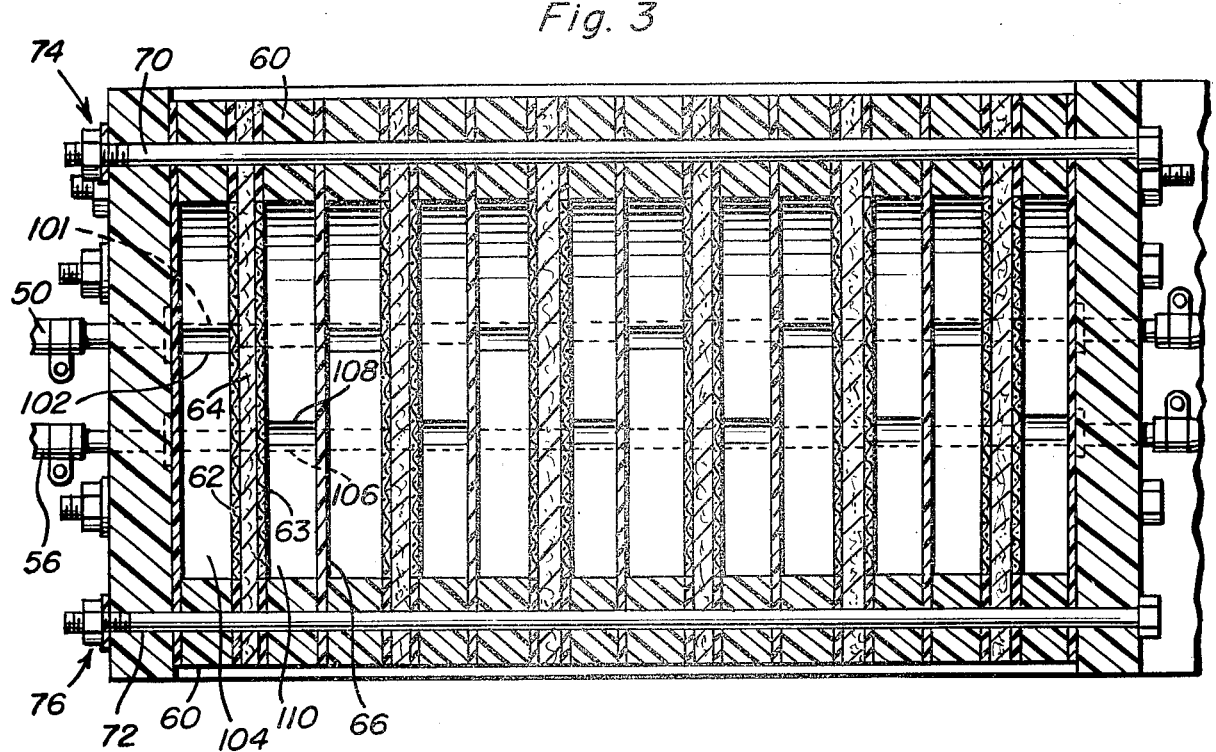
FIG. 3 is a transverse sectional view of the electrolyzer taken generally along the line 3—3 of FIG. 2.

The electrolyzing system or hydrogen-oxygen generator 30 is comprised of a series of high temperature thermal set plastic discs 60 having about a 5-inch outside diameter and 3-inch inside diameter, see FIG. 6. Between each two discs 60 is an electrode package of two solid nickel wire mesh electrodes 62 and 63 closely separated by an ion exchange membrane gas barrier 64. Separating adjacent discs 60 is rubber or fiber glass separator 66 thus forming separate electrolysis cells, each cell comprising a pair of plastic discs 60 containing the electrode package therebetween. Electrodes 62 and 63 and gas barrier 64 are sealed by a rubber gasket 68. The electrolyzer 14 shown in FIGS. 2 and 3 is a 6-cell unit, the composite electrolyzer being secured by 6 bolts threaded at each end and a washer and nut assembly, such as bolts 70 and 72 and washer and nut assemblies 74 and 76 as shown in FIG. 3.

Figure 4:
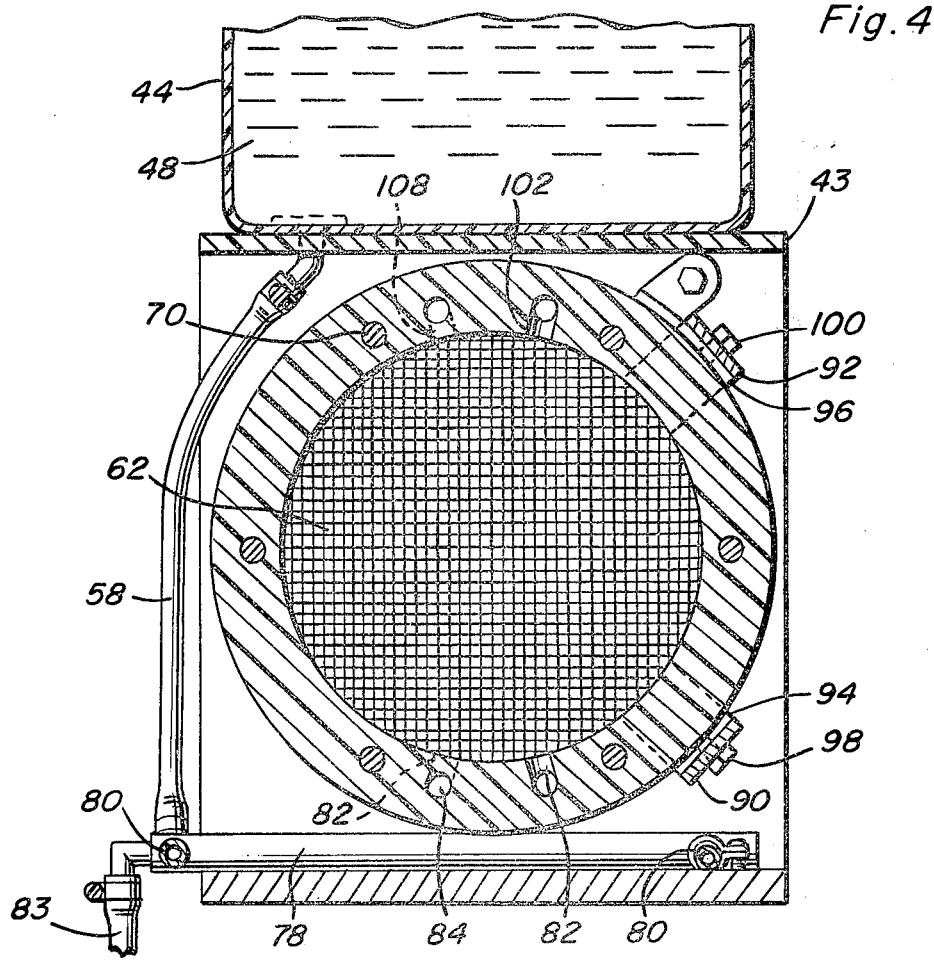
FIG. 4 is a transverse sectional view of the electrolyzer of the present invention taken generally along the line 4—4 of FIG. 2.

In operation, aqueous electrolyte solution 48, such as potassium hydroxide in distilled water is poured into storage tanks 44 and 46 until each is about one-half full. The electrolyte solution passes to the cells through electrolyte reservoir connection 58 and through electrolyte return manifold 78 containing electrolyte return hoses 80 placed on both sides of electrolyzer system 30 and a drain 83 as shown in FIGS. 2 and 4. Each electrolyte hose 80 supplies electrolyte solution to the cells by providing an alternating system of ports 82 and passages 84 through plastic discs 60, electrolyte hoses 80 including the appropriate aperture at each port 82. Other electrolyte return systems may be used without departing from the scope of the invention, it only being necessary to maintain the proper level of electrolyte in each cell for the generation of hydrogen and oxygen gases.

The decomposition of the electrolyte solution into separate hydrogen and oxygen gases is formed by the electric current generated by heat activated engine 16 which is conducted to electrical connectors 86 and 88 via conductors 38 and 40 from the alternator, thus completing the electric circuit. Electrodes 62 and 63 in each cell are connected to a different electrical potential through electrical conducting connectors 90 and 92 and electric terminals 94 and 96 shown in FIGS. 2 and 4. Electrical conducting connectors 90 and 92 are secured to electric terminals 94 and 96 respectively by means of nut and bolt assemblies 98 and 100.

The hydrogen and oxygen gases are formed at electrodes 62 and 63, respectively, due to the differing electric potential applied, each gas being conveyed to their respective storage tanks 44 and 46. As shown in FIG. 3, hose 50 conducting hydrogen gas to storage tank 44 includes a series of apertures 101 juxtaposed with port 102 in plastic disc 60 which forms part of the cell unit indicated by 104. Oxygen transport hose 56 includes aperture 106 juxtaposed with port 108 associated with cell half 110 and transports the formed oxygen at electrode 63 to the respective storage tank 46. Hydrogen gas transport hose 50 is not open to cell half 110 which does not include a hydrogen gas port through the disc 60. Each gas transport line is only open to a specific cell half which will form the specific gas, enabling the hydrogen and oxygen gases to be separated and thus stored separately and supplied separately to the intake of the internal combustion engine. As can be seen in FIGS. 2 and 3, the gas passes through the entire electrolyzer system 30 and out through both ends thereof.

Once the internal combustion engine is started, hot exhaust therefrom creates the motion force of heat activated engine 16, and thus the electric current for electrolysis. The gases freed by the electrochemical action push their way out through the respective gas ports and hoses, pushing the electrolyte solution ahead and forming a foamed mixture of electrolyte and gas. The electrolyte is pushed into the storage tanks of storage and supply 32 whereupon the electrolyte and gases are separated, the electrolyte returning to the electrolyzer system 30 via electrolyte return connection 58. Hoses 34 and 36 which supply the hydrogen and oxygen gas, respectively, to the fuel intake can include control valves on respective fittings 35 and 37 to vary the specific amounts of each gas supplied to carburetor 20.

FIG. 7 illustrates a preferred heat activated engine which is used to generate for rectification the needed linear alternations of electric current for electrolysis. While any engine which can derive its energy from the waste heat of the exhaust of an internal combustion engine is applicable, the Stirling free piston linear alternator, shown in FIG. 7 is the one which appears to be the most adaptable for on-board motor vehicle use. While the Stirling engine illustrated herein is a commercial product and is the subject of trade literature, a brief description of its components is appropriate. The free piston Stirling engine is generally indicated at 112 and is shown clamped to exhaust pipe 24 or an extension from the exhaust pipe including aperture 114 therein to provide the heat required to run the engine. The free piston Stirling engine comprises a gas spring 116, power piston 118 and displacer 120, the linear movement of power piston 118 in conjunction with linear generator 122 generating the needed linear alternations of electrical current. Also note the exhaust gases do not contact the piston faces of the piston of the Stirling engine.

The critical feature of the free piston Stirling engine is the varying volume of the working space above and below displacer 120. When gas pressure in compression space 124 shoves displacer 120 down, gas in the hot end expansion space 126 is forced through regenerator 128 and into cold compression space 124. As the displacer continues to move downward, the gas pressure in compression space 124 is overcome by the gas pressure in gas spring 116 thus pushing power piston 118 down. However, the gas in the hot end expansion space 126 has a greater pressure due to expansion caused by the heat from the exhaust than the gas in compression space 124, thus forcing the displacer back up pushing cold gas from compression space 124 through the regenerator 128 and heater tubes 130, returning heat to the gas. Gas flowing into hot end expansion space 126 pushes up displacer 120 and power piston 118. The gas pressure in the hot end expansion space 126 then drops and gas in compression space 124 bounces the displacer 120 back, completing the cycle. The free piston Stirling engine illustrated in FIG. 7 is manufactured by Sunpower Incorporated in Athens, Ohio, the previous description coming from a summary of trade literature.

The combination of an electrolyzer to produce the hydrogen and oxygen gas with an engine which can derive its energy from direct heat exchange with the exhaust gases of an internal combustion engine to generate the electrical current necessary to produce the gases is much lighter in weight and much less complex than prior art systems and, in particular, with the free piston Stirling linear alternator which can be placed in any position enables the system to be easily accommodated on board a motor vehicle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A device in combination with an internal combustion engine for electrolytically supplying supplemental fuel thereto comprising means to produce oxygen and hydrogen gas from water, said gas producing means having a separate tank system for storing an aqueous electrolyte solution in reservoirs and for separately storing each component gas decomposed from the aqueous electrolyte solution, said gas producing means further having an electrolyzing system including a series of electrolysis cells having closely spaced electrodes in a stacked array and including means piping derived gases from the electrolysis cells to the respective reservoirs and means piping aqueous electrolyte solution from the reservoirs to the series of electrolysis cells, said means forming said gases by the electrolysis of water, said device further comprising a means to generate linear alternations of electrical current for conduction to said gas producing means, said means to generate electrical current being activated by heat from exhaust means of said internal combustion engine, said electrical generating means being positioned adjacent said exhaust means, means for conducting said electrical current to said gas producing means and means to transport said gases from the separate tank system to the internal combustion engine, each of the electrolyte cells comprising a gas barrier performing as an ion exchange member when sandwiched between two solid nickel wire mesh electrodes, hollow annular members in turn sandwiching the assembly of electrodes and the gas barrier, and an elastomeric gasket bounded and sealed about said cells.

2. The device as set forth in claim 1 wherein said electrical generating means is so positioned to be activated by direct heat exchange from exhaust gases from said internal combustion engine without impact of exhaust gas.

3. The device as set forth in claim 1 wherein said electrical generating means is a linear generator in which a piston is moved back and forth linearly solely in response to the heat exchange from said exhaust gases.

4. A device in combination with an internal combustion engine for electrolytically supplying supplemental fuel thereto comprising means to produce oxygen and hydrogen gas from water by the electrolysis of water and having a series of electrolysis cells, each of the cells having a pair of closely spaced electrodes contained in a supply of water and further having separate oxygen and hydrogen ports for exiting the respective gases, the respective ports being positioned in each of the cells adjacent a respective one of the closely spaced electrodes, means applying a different electrical potential to each of the electrodes in each of the cells for the cells to produce oxygen and hydrogen gas, separate storage container means supplying water to the series of electrolysis cells and separately collecting the oxygen and hydrogen gas from the separate oxygen and hydrogen ports, means to generate linear alternations of electrical current coupled to the respective electrodes of the gas producing means and the means generating electrical current being so integrally positioned in the path of the exhaust gases of the internal combustion engine to be activated by direct heat exchange means, means to transport said gases from the respective oxygen and hydrogen ports to a carburetor of the internal combustion engine, the series of electrolysis cells being comprised of a series of high temperature thermal set plastic discs between a pair of which is an electrode package of two solid nickel wire mesh electrodes separate by an ion exchange membrane gas barrier means and electrically insulating separator disc means interposed between an adjacent pair of discs.

5. A device in combination with an internal combustion engine for electrolytically supplying supplemental fuel thereto comprising means to produce oxygen and hydrogen gas from water by the electrolysis of water and having a series of electrolysis cells, each of the cells having a pair of closely spaced electrodes contained in a supply of water and further having separate oxygen and hydrogen ports for exiting the respective gases, the respective ports being positioned in each of the cells adjacent a respective one of the closely spaced electrodes, means applying a different electrical potential to each of the electrodes in each of the cells for the cells to produce oxygen and hydrogen gas, separate storage container means supplying water to the series of electrolysis cells and separately collecting the oxygen and hydrogen gas from the separate oxygen and hydrogen ports, means to generate linear alternations of electrical current coupled to the respective electrodes of the gas producing means and the means generating electrical current being so integrally positioned in the path of the exhaust gases of the internal combustion engine to be activated by direct heat exchange means, and means to transport said gases from the respective oxygen and hydrogen ports to a carburetor of the internal combustion engine, each of the cells has their electrodes and the gas barrier means sealed by a rubber gasket.

6. A device in combination with an internal combustion engine for electrolytically supplying supplemental fuel thereto comprising means to produce oxygen and hydrogen gas from water by the electrolysis of water and having a series of electrolysis cells, each of the cells having a pair of closely spaced electrodes contained in a supply of water and further having separate oxygen and hydrogen ports for exiting the respective gases, the respective ports being positioned in each of the cells adjacent a respective one of the closely spaced electrodes, means applying a different electrical potential to each of the electrodes in each of the cells for the cells to produce oxygen and hydrogen gas, separate storage container means supplying water to the series of electrolysis cells and separately collecting the oxygen and hydrogen gas from the separate oxygen and hydrogen ports, means to generate linear alternations of electrical current coupled to the respective electrodes of the gas producing means and the means generating electrical current being so integrally positioned in the path of the exhaust gases of the internal combustion engine to be activated by direct heat exchange means, means to transport said gases from the respective oxygen and hydrogen ports to a carburetor of the internal combustion engine, each of the electrolyte cells comprising a gas barrier performing as an ion exchange member when sandwiched between two solid nickel wire mesh electrodes, hollow annular members in turn sandwiching the assembly of electrodes and the gas barrier, and an elastomeric gasket bounded and sealed about said cells.

7. The device as set forth in claim 1, 4, 5 or 6 wherein said electrical generating means comprises a free piston Stirling engine linear generator.

8. The invention of claims 1, 4, 5 or 6 wherein the gas producing means further contains a foamed mixture of an electrolyte and gas capable of being pushed into the storage container means where the gases separate from the electrolyte and the gases are conveyed through the respective ports and conduit means return the electrolyte to the series of electrolysis cells.

* * * * *